United States Patent [19]
Wienand et al.

[11] 3,761,555
[45] Sept. 25, 1973

[54] PROCESS FOR THE MANUFACTURE OF THERMOPLASTIC PLATES

[75] Inventors: Michael Wienand, Siegburg; Hans Brinkman, Troisdorf; Peter Rheinfeld, Troisdorf; Ernst Jüch, Troisdorf, all of Germany

[73] Assignee: Dynamit Nobel AG, Troisdorf, Germany

[22] Filed: Mar. 25, 1970

[21] Appl. No.: 22,579

[52] U.S. Cl............... 264/105, 264/113, 264/118, 264/142
[51] Int. Cl.............................................. B01j 2/22
[58] Field of Search................ 264/140, 112, 118, 264/141, 142, 113, 105

[56] References Cited
UNITED STATES PATENTS

| | | | |
|---|---|---|---|
| 3,466,223 | 9/1969 | Beeler et al. | 264/126 |
| 3,499,956 | 3/1970 | Mountain | 264/140 |
| 3,057,012 | 10/1962 | Lufkin | 264/140 |
| 1,975,515 | 10/1934 | Mayer | 264/115 |
| 3,492,388 | 1/1970 | Inglin-Knüsel | 264/118 |
| 2,689,398 | 10/1954 | Gaut et al. | 264/115 |
| 2,729,770 | 1/1956 | Robbins | 264/140 |

FOREIGN PATENTS OR APPLICATIONS
733,413   5/1966   Canada................ 264/14

*Primary Examiner*—Robert F. White
*Assistant Examiner*—J. R. Hall
*Attorney*—Craig, Antonelli & Hill

[57] ABSTRACT

A process for the production of thermoplastic plates from chips of a thermoplastic material which includes the steps of calendering a granulated synthetic polymeric thermoplastic material into at least one crude sheet, cuttting the crude sheet into transverse strips, cutting the transverse strips longitudinally into chips, each having an approximately rectangular configuration, stacking the chips in a uniform distribution up to the level of the desired rough block, heating the stacked chips and then subdividing the stack into the dimensions of the rough block desired. Thereafter, the rough block is placed in a mold where it is compressed with heating and subsequently cooled and then divided into plates.

16 Claims, 7 Drawing Figures

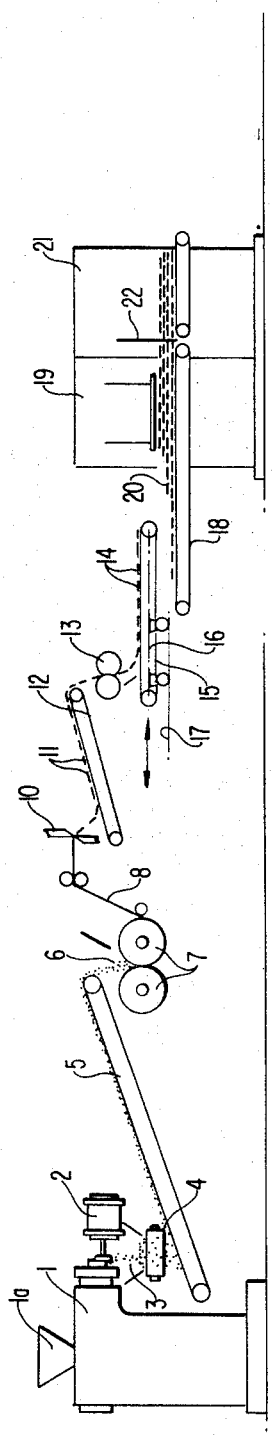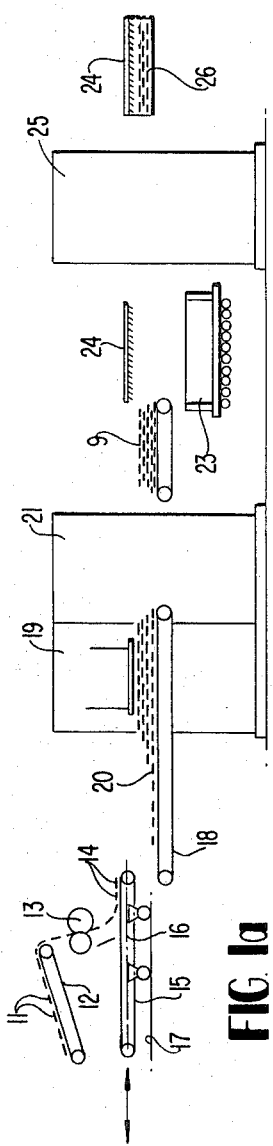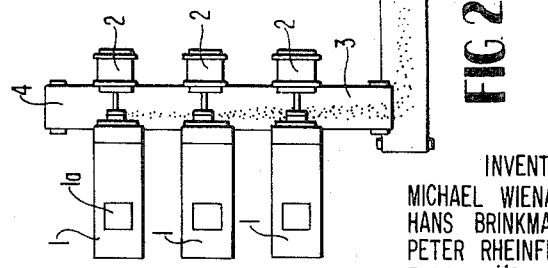

A PROCESS FOR THE MANUFACTURE OF THERMOPLASTIC PLATES

BACKGROUND OF THE INVENTION

The present invention relates to a process for the mechanical manufacture of rough blocks from chips of a synthetic polymeric thermoplastic material and for the further processing and production of plates, sheets, and the like therefrom. According to the present invention regularly shaped chips are placed in a box mold to form a rough block and the thus-formed block is pressed under heating, and after cooling, is divided into plates and the like.

It is known from a manufacturing process for celluloid to heat and press thermoplastic materials in a box-shaped mold to form a block and then to divide the block, after cooling, mechanically into plates. As long as fluid starting materials are involved which are readily pourable, there is no problem in obtaining a good distribution in the mold. This distribution becomes substantially more difficult when it is desired to fill the mold with chips of a size of, for example about 60 mm × 60 mm × 3 mm. In this case, the procedure is dependent upon the skill of the personnel, especially when the process is conducted with differently colored materials. The external heating of the block causes the disadvantage that, during fusion or welding under pressure, the material which is hot on the outside is pressed toward the center of the block and thus the pattern obtained is different, as seen over the thickness of the block.

SUMMARY OF THE INVENTION

An object of the present invention is to avoid the prior art disadvantages in manufacturing rough blocks.

Another object of the present invention is to provide an improved process for manufacturing rough blocks wherein a uniform distribution of the chips used to produce the rough blocks can be obtained.

A further object of the present invention is to provide an improved process for manufacturing rough blocks wherein plates containing a uniform pattern and special patterning or design effects can be produced from the rough blocks.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Pursuant to the present invention, the above-mentioned disadvantages may be eliminated and a much improved process for manufacturing rough blocks may be obtained, without additional expense, by calendering from a granulated material a crude sheet having approximately the width of the block to be produced, cutting this crude sheet into transverse strips, and dividing these strips into chips each having an approximately rectangular configuration, whereupon the chips are stacked in a uniform distribution up to the level of the rough block desired. Then the chips are heated, and the stack is subdivided in accordance with the desired depth dimension of the rough block. The subdivided portions are then inserted into the box mold in this form. By means of this method, a uniform distribution of the chips over the width, as well as along the length and depth of the material for forming the rough block is obtained, thereby producing a uniform pattern in the plates obtained from the block. The mechanical nature of the process of the present invention ensures that the process and thus the pattern can be reproduced.

Advantageously, the chips, along the conveying path to the stacking stage, are, in part, rotated, i.e. positioned transversely, so that the originally present longitudinally oriented grain cannot be seen in the rough sheet.

In order to obtain special patterning or design effects, more than one rough sheet can be produced from the granulated material, and these rough sheets can then be laminated into a single rough sheet.

Heretofore, electrically conductive substrates, e.g. floors, bases, etc., have been manufactured by surrounding granulated material with a conductive envelope (casing) and then molding the same by pressure in a box mold. According to this method, a high-frequency heating of the material is impossible, since contact is established between the lower electrode and the upper electrode by means of the conductive envelope. In order to overcome this difficulty, another non-conductive envelope was applied around the conductive envelope, a procedure which is very cumbersome and expensive. The present invention overcomes this deficiency by inserting, during the lamination of several rough sheets, an electrically conductive paste between these sheets, whereafter a heat treatment is readily conducted.

BRIEF DESCRIPTION OF THE DRAWINGS

The present invention will become more fully understood from the detailed description given hereinbelow and the accompanying drawings which are given by way of illustration only and thus are not limitative of the present invention and wherein, FIGS. 1 and 1a show a lateral view of a production line for manufacturing rough blocks from chips of a thermoplastic material, and for further processing said chips into plates or the like;

FIG. 2 is a plan view of the arrangement of FIG. 1;

DESCRIPTION OF THE PREFERRED EMBODIMENTS

Figure 3:
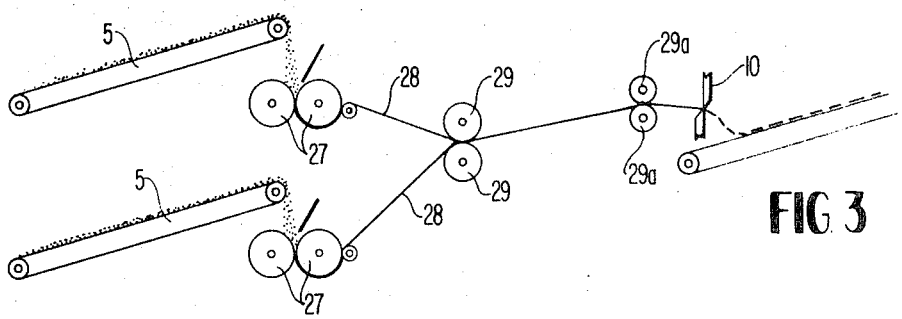
FIGS. 3 through 5 represents arrangements for obtaining special design effects.

Referring now to the drawings wherein like reference numerals are used throughout the various views to designate like parts, differently colored thermoplastic granulated material is introduced to one or more screw extruders 1 through hoppers 1a. Alternatively, when more than one screw extruder is utilized, each screw is individually fed with one-color of the granulated material. The material is plasticized and then conveyed to a cutting device 2 which once again granulates the material. During this process, the granulated material 3 drops onto a conveyor belt 4 which conveys the material to a transverse-moving belt 5 disposed at an angle to the belt 4. This transverse-moving belt uniformly distributes the hot granulated material 3 into a gap 6 formed between two rolls 7. In this gap, a crude sheet 8 is produced having approximately the width of the block 26 to be pressed. In cutter 10, the crude sheet 8 is cut into transverse strips which are fed by conveyor belt 12 to a longitudinal cutter 13. The longitudinal cutter 13 divides the transverse strips 11 of the crude sheets into chips 14. These chips drop onto a conveyor belt 15 which is fashioned as a carriage 16 and which is movable to and fro on an underframe 17. In this connection, the conveyor belt 15 can be moved at a greater speed than the carriage 16. During the advancement of the carriage 16 in the operating direction, the conveyor belt 15 is at a standstill and thus collects the severed chips 14. Upon the return of the carriage 16, the conveyor belt 15 moves at twice the speed of the carriage 16 in the forward direction and, during this process, deposits the chips 14 onto the conveyor belt 18 associated with a high-frequency tunnel 19.

By the transfer of the chips 14 from the longitudinal cutter 13 to the conveyor belt 15 and from there to the belt 18, a partial rotation of the chips 14 is effected, so that the longitudinal orientation which originated at the roll mechanism 7 is not visible in the material 20. The uniform distribution of the chips 14 also makes it possible to unformly heat the material 20 in the higher-frequency field of the tunnel 19. In the hot-air tunnel 21, the material 20 is additionally heated externally and cut to the dimensions of a rough block 9 by means of a cutting device 22. The hot rough block 9 is inserted into a box mold 23, covered by a toothed (serrated) plate 24, and then densely compressed in a press 25 and cooled. In this connection, the toothed plate 24 serves the purpose of retaining the finished pressed block 26 during the paring-off, or cutting, of the individual plates.

In FIG. 3, an embodiment is illustrated for producing special effects in the pattern (design). By means of two or more roll mechanisms 27, one rough sheet 28 is respectively drawn from each roll mechanism, said sheets being then laminated by means of a pair of rolls 29. After passing through a further pair of rolls 29a, the laminated sheet is cut into transverse strips by the cutting device 10. The further treatment takes place as explained in connection with FIGS. 1, 1a and 2.

Figure 4:
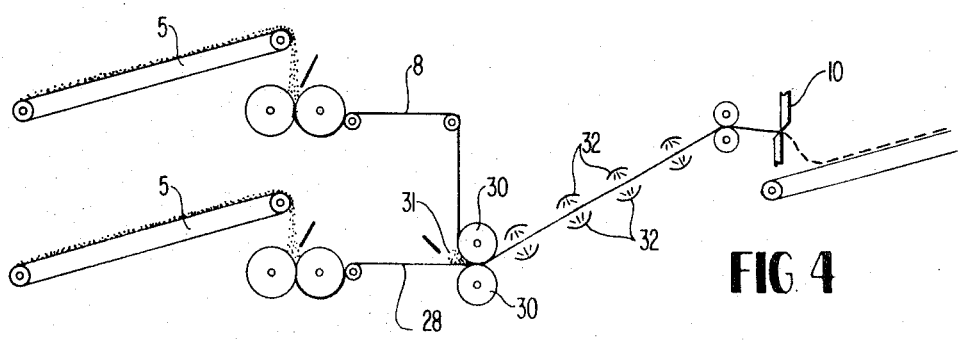

FIG. 4 shows the embodiment of the present invention wherein a conductive coating is applied to the rough sheets. The arrangement substantially corresponds to that of FIG. 3, except that in place of the laminating rolls 29, a pair of rolls 30 are arranged. In the gap in front of the rolls 30, a conductive paste 31 is applied between the two rough sheets 8 and 28. In the subsequent heating from infrared heat source 32, the paste is then gelled. The remaining operating steps correspond to those described above.

Figure 5:
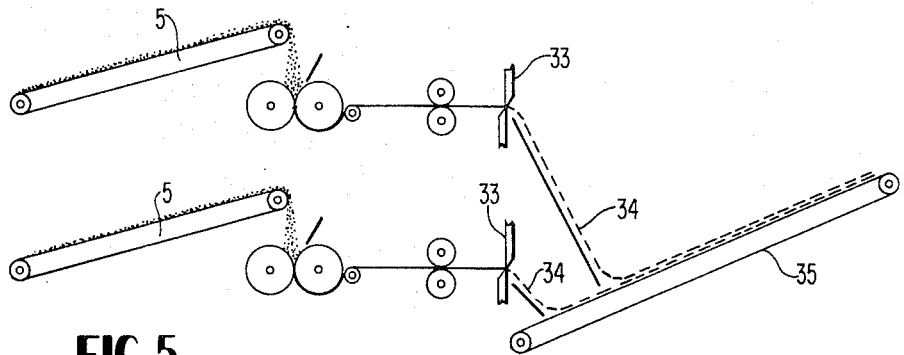

FIG. 5 represents an arrangement utilizing two transverse cutters (shears) 33. These permit the manufacture of transverse strips 34 of differing widths. The transverse strips 34 can be collected by means of only one conveyor belt 35 and then can be longitudinally cut together. However, it is also possible to operate with two conveyor belts and two longitudinal cutters, whereby a greater number of possibilities for variation in the pattern are obtained.

In the operations illustrated in FIGS. 1–5, the starting material is a granulated thermoplastic used to form a rough sheet 8 having the width of the pressed block 26. The chips 14 in forming the stack material 20 extend laterally, due to the size of the chips.

Figure 6:
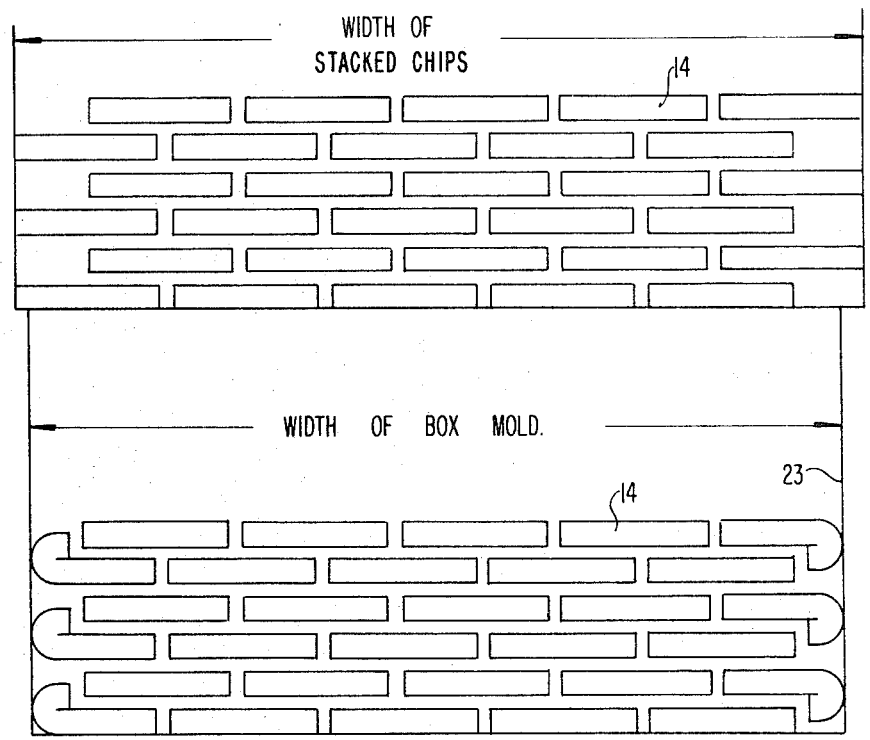
FIG. 6 illustrates the relationship between the widths of stacked chips prior to compression and the width of the box-mold for forming the pressed block.

FIG. 6 represents the relationship between the width of the stacked chips forming material 20 prior to compression and the width of the box-mold for forming the pressed block. The heated rough block 9 is suitably wider by one-half the width of a chip than the finished pressed block 26 so that in the finished pressed block 26 a dense packing is also obtained at the margin of the mold, and thus flow of the material toward the margin of the mold-box is avoided during the pressing step. In the direction of travel of the stacked material; the material is cut to the length of the block to be pressed and as there is a dense packing of the chips, no flow of material occurs at the margin during the pressing step. Less flow of the material is produced within the block during the pressing step, said flow being desirable for obtaining a special pattern effect. The mechanical manufacture of the material 20 insures that the process and thus also the respective patterns are reproducible.

Exemplary of the synthetic polymeric thermoplastic materials which can be treated by the process of the present invention include polyolefins, e.g. polyethylene and polypropylene, polystyrene, polyvinyl compounds, e.g. polyvinylchloride, polyvinlidene chloride, polytetrafluoroethylene, polymethylmethacrylate, nylon and the like.

The electrically conductive pastes which can be used in the present invention can comprise, for example, carbon black (furnace black) having an average particle size of about 23 m$\mu$. This carbon black does not contain any additives and can be brushed, dry, into the surface of the thermoplastic sheets. The carbon black can also be modified with other materials, such as for example, plasticizers, alcohols and various resinous materials. Typical conductive paste compositions include, for example, about 10 to 60 percent by weight carbon black, about 4 to 7 percent by weight of a plasticizer and about 83 to 90 percent by weight of an alcohol or about 4 to 17 percent by weight carbon black, about 58 to 67 percent by weight of a plasticizer and about 25 to 29 percent by weight of polyvinyl chloride. The ground leakage resistance of the paste, depending on the particular composition is between about $1 \times 10^3$ and $1 \times 10^6$ ohms.

The invention being thus described, it will be obvious that the same may be varied in many ways. Such variations are not to be regarded as a departure from the spirit and scope of the invention, and all such modifications as would be apparent to one skilled in the art are intended to be included.

What is claimed is:

1. A continuous process for the production of plates from chips of a synthetic polymeric thermoplastic material comprising:
    a. calendering a granulated synthetic polymeric thermoplastic material into a thermoplastic sheet;
    b. cutting said thermoplastic sheet into transverse strips;
    c. cutting said transverse strips longitudinally into chips having approximately rectangular configurations;
    d. stacking said chips in continuous succession in uniform layers up to a desired height;
    e. heating uniformly said stacked chips to form a continuous heated unitary stack of chips;

f. cutting said continuous heated unitary stack of chips to form successively single heated rough blocks;
g. depositing each of said heated rough blocks into a box mold;
h. compressing said heated rough blocks in said box mold to form a pressed block;
i. cooling said pressed blocks; and
j. cutting plates from each of said pressed blocks.

2. The process according to claim 1, wherein while being conveyed to the stacking step (d) said chips are partially rotated.

3. The process according to claim 1, wherein said granulated thermoplastic material is calendered into more than one formed thermoplastic sheet which are then laminated together into a single thermoplastic sheet.

4. The process according to claim 3, wherein an electrically conductive paste is inserted between said thermoplastic sheets followed by a subsequent heating of said sheets.

5. The process according to claim 1, wherein said granulated thermoplastic material is calendered into a plurality of thermoplastic sheets which are separately cut into transverse strips, collectively deposited on a conveyor means and then longitudinally cut together.

6. The process according to claim 1, wherein said granulated thermoplastic material is calendered into a plurality of thermoplastic sheets which are separately cut into transverse strips, deposited on separate conveying means and then separately cut, longitudinally.

7. The process according to claim 1, wherein said thermoplastic sheet is produced by plasticizing differently colored granulated thermoplastic material in a screw extruder, granulating the extruded product and calendering the granulated extruded product.

8. The process according to claim 4, wherein said electrically conductive paste includes carbon black.

9. The process according to claim 4, wherein said electrically conductive paste comprises about 10 to 60 percent by weight carbon black, about 4 to 7 percent by weight plasticizer and about 83 to 90 percent by weight of an alcohol.

10. The process according to claim 4, wherein the electrically conductive paste comprises about 4 to 17 percent by weight carbon black, about 58 to 67 percent by weight plasticizer and about 25 to 29 percent by weight polyvinyl chloride.

11. The process according to claim 1, wherein said box mold is narrower in width than said rough blocks whereby each of said pressed blocks exhibits a corresponding narrower width than said rough blocks.

12. The process according to claim 8, wherein said carbon black is brushed dry onto at least one of the inner surfaces of said thermoplastic sheets prior to the lamination step.

13. The process according to claim 1, wherein the heating step (e) is conducted without the application of pressure.

14. The process according to claim 11, wherein concurrent with and immediately after the formation of the heated rough blocks by cutting, said rough blocks are subjected to a further heating step.

15. A continuous process for the production of plates from chips of a synthetic polymeric thermoplastic material comprising:
a. calendering a granulated synthetic polymeric thermoplastic material into at least one thermoplastic sheet;
b. cutting said thermoplastic sheet via a first cutting means into transverse strips;
c. conveying said transverse strips to a second cutting means;
d. cutting said transverse strips via said second cutting means longitudinally into chips having approximately rectangular configurations;
e. depositing the longitudinally cut chips onto a reciproating conveyor means for stacking said chips;
f. stacking said chips in continuous succession in uniform layers up to a desired height;
g. heating said stacked chips in a high-frequency field tunnel and then in a hot-air tunnel to form a continuous stack of chips;
h. transversely cutting said continuous stack of chips whereby at least one single heated rough block is formed;
i. heating said single heated rough block into a box mold;
j. compressing said single heated rough block to form a pressed block;
k. cooling said pressed block; and
l. cutting said pressed block into plates.

16. The process according to claim 15, wherein said heating step (g) is conducted without the application of pressure.

* * * * *